(12) United States Patent
Miyahara et al.

(10) Patent No.: US 9,709,704 B2
(45) Date of Patent: **\*Jul. 18, 2017**

(54) ANTI-REFLECTION FILM AND METHOD FOR MANUFACTURING ANTI-REFLECTION FILM

(71) Applicant: Tamron Co., Ltd., Saitama-shi (JP)

(72) Inventors: Masaaki Miyahara, Saitama (JP); Minoru Shibuya, Saitama (JP); Terufusa Kunisada, Saitama (JP)

(73) Assignee: Tamron Co., Ltd., Saitama-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,510

(22) Filed: Oct. 9, 2012

(65) Prior Publication Data

US 2013/0271842 A1 Oct. 17, 2013

(30) Foreign Application Priority Data

Oct. 12, 2011 (JP) ................. 2011-224915

(51) Int. Cl.
*G02B 1/11* (2015.01)
*G02B 1/115* (2015.01)
*G02B 1/118* (2015.01)

(52) U.S. Cl.
CPC ............... *G02B 1/11* (2013.01); *G02B 1/115* (2013.01); *G02B 1/118* (2013.01)

(58) Field of Classification Search
CPC ........... G02B 1/11; G02B 1/115; G02B 1/118; B32B 3/30

(Continued)

(56) References Cited

U.S. PATENT DOCUMENTS

2006/0215280 A1 9/2006 Hayashi et al.
2009/0261063 A1 10/2009 Munzert et al.
(Continued)

FOREIGN PATENT DOCUMENTS

CN 1837863 A 9/2006
JP 2005157119 A 6/2005
(Continued)

OTHER PUBLICATIONS

English language translation attached of JP 2010-038948, Imai et al.*

(Continued)

*Primary Examiner* — Thomas K Pham
*Assistant Examiner* — Marin Pichler
(74) *Attorney, Agent, or Firm* — The Webb Law Firm

(57) ABSTRACT

An object of the present invention is to provide an anti-reflection film excellent in high-temperature and high-humidity environment resistance and scratch resistance in addition to improved anti-reflection performance of a concave-convex nanostructure. To achieve the object, an anti-reflection film 10 comprises: a base layer 11 as a first optical thin film that is provided on an optical surface 21*a* of an optical element 21; a concave-convex nanostructure layer that is provided on a surface of the base layer 11 and is composed of a concave-convex nanostructure 12 formed so as to have a pitch width p between the convex parts 12*b* of shorter than an incident light wavelength; and a cover layer 13 as a second optical thin film that covers peaks of the convex part 12*b* with a void 14 being provided between the cover layer 13 and concave part 12*a* constituting the concave-convex nanostructure 12.

14 Claims, 8 Drawing Sheets

(58) Field of Classification Search
USPC .................................. 359/586, 601
See application file for complete search history.

(56) References Cited

U.S. PATENT DOCUMENTS

| | | | |
|---|---|---|---|
| 2009/0324910 A1* | 12/2009 | Gemici et al. ................ | 428/212 |
| 2010/0296168 A1* | 11/2010 | Sano ............................. | 359/586 |
| 2010/0313875 A1* | 12/2010 | Kennedy ....................... | 126/652 |
| 2011/0051246 A1* | 3/2011 | Schulz .................... | G02B 1/111 |
| | | | 359/586 |
| 2011/0051249 A1* | 3/2011 | Endoh et al. ................ | 359/599 |
| 2011/0120554 A1* | 5/2011 | Chhajed .................. | C09D 1/00 |
| | | | 136/259 |
| 2012/0229906 A1* | 9/2012 | Miyahara et al. ............ | 359/601 |
| 2013/0011611 A1* | 1/2013 | Taguchi ................. | C09J 7/0207 |
| | | | 428/142 |

FOREIGN PATENT DOCUMENTS

| | | | | |
|---|---|---|---|---|
| JP | 2008-209540 A | | 11/2008 | |
| JP | 2010-038948 | * | 2/2010 | ............. B32B 7/02 |
| JP | 201048896 A | | 3/2010 | |
| JP | 2010511079 A | | 4/2010 | |
| JP | WO 2011118367 A1 * | | 9/2011 | ........... C09J 7/0207 |
| JP | 2012128168 A | | 7/2012 | |

OTHER PUBLICATIONS

Willey, Practical Design of Optical Thin Films, Second Edition, Nov. 2007, pp. 99-110, Willey Optical, Consultants, Charlevoix, United States of America.

* cited by examiner

ANTI-REFLECTION FILM AND METHOD FOR MANUFACTURING ANTI-REFLECTION FILM

BACKGROUND OF THE INVENTION

Field of the Invention

The present invention relates to an anti-reflection film which is provided on an optical surface of an optical element main-body to reduce reflection of incident light, and a method for manufacturing the anti-reflection film and more particularly relates to an anti-reflection film comprising a concave-convex nanostructure, and a method for manufacturing the anti-reflection film.

Background Art

In a conventional optical element such as a lens, an anti-reflection film comprising an anti-reflection structural body is provided on an optical surface to reduce a loss of transmitting light due to surface reflection. A concave-convex nanostructure in which convex parts are regularly arranged at a shorter interval than the wavelength of incident light has been known as one example of the anti-reflection structural body (e.g., see "Patent document 1: National Publication of International Patent Application No. 2010-511079" and "Patent document 2: Japanese Patent Laid-Open No. 2010-48896"). When the concave-convex nanostructure is provided on an optical surface of an optical element, an anti-reflection effect can be achieved in a wide wavelength range and a wide incident angle of an incident light.

The concave-convex nanostructure has numerous convex parts that protrude from the optical surface side of the optical element. To reduce reflection, it is necessary to form a gradual refractive index distribution in a depth direction of the concave-convex nanostructure from the air as a medium of incident light. For this reason, the convex part may have a tapered shape whose peak is thinner than its proximal end. Thus, a problem that the surface of the concave-convex nanostructure might be easily damaged mechanically, i.e. poor in scratch resistance.

The surface area of the concave-convex nanostructure is much larger than the surface area of the optical surface of the optical element. Thus, for example, when the concave-convex nanostructure is kept for a long period of time under a high-temperature and high-humidity environment, water or the like adsorbs to the concave-convex nanostructure and the spoiled concave-convex nanostructure may cause a problem, poor anti-reflection performance.

To solve the problems, for example, the anti-reflection film disclosed in Patent document 1 prevents mechanical damage or water adsorption by providing a transparent protective coat having a film thickness of 10 nm to 50 nm on the surface of the concave-convex nanostructure.

However, in the protective coat disclosed in Patent document 1, concave parts of the concave-convex nanostructure are filled with a cover layer constituting material. Thus, the gradual refractive index distribution formed in the depth direction of the concave-convex nanostructure from the air as the medium of incident light cannot be maintained, and the anti-reflection performance of the anti-reflection film may be made poor.

In the anti-reflection film comprising a refractive index gradient layer, a refractive index distribution ideal in reducing the reflection has been known (e.g., see Non Patent document 1: "Practical Design of Optical Thin Films" by Ronald R. Willey, p. 101, Willey Optical, Consultants, November 2007) (see FIG. 2). However, it is difficult to form the ideal refractive index distribution in the depth direction just by the concave-convex nanostructure, and further improvement in the anti-reflection performance is required.

In view of the above, an object of the present invention is to provide an anti-reflection film comprising a concave-convex nanostructure excellent in both high-temperature and high-humidity environment resistance and scratch resistance in addition to further improved anti-reflection performance, an anti-reflection optical element comprising the anti-reflection film, and a method for manufacturing the anti-reflection film.

SUMMARY OF THE INVENTION

As a result of intensive study, the present inventors have achieved the above object by employing an anti-reflection film, an anti-reflection optical element, and a method for manufacturing an anti-reflection film described below.

An anti-reflection film according to the present invention is an anti-reflection film to be provided on an optical surface of an optical element to reduce reflection of incident light, comprising: a base layer as a first optical thin film that is provided on the optical surface; a concave-convex nanostructure layer that is provided on a surface of the base layer and is composed of a concave-convex nanostructure formed so as to have pitch width between the convex parts of shorter than an incident light wavelength; and a cover layer as a second optical thin film that covers peaks of the convex part constituting the concave-convex nanostructure with a void being provided between the cover layer and concave part of the concave-convex nanostructure.

In the anti-reflection film according to the present invention, a refractive index of the cover layer at a reference wavelength $\lambda_0$ (400 nm ≤ $\lambda_0$ ≤ 700 nm) is preferable to be 1.15 to 1.8 inclusive.

In the anti-reflection film according to the present invention, an optical thickness ($n_c \times d_c$) of the cover layer is preferable to satisfy a following expression (1).

[Expression 1]

$$0.05 \times (\lambda_0/4) < n_c \times d_c < 0.75 \times (\lambda_0/4) \quad (1)$$

where, $n_c$: refractive index of the cover layer
$d_c$: physical thickness of the cover layer
$\lambda_0$: reference wavelength In the anti-reflection film according to the present invention, the cover layer is formed as a porous film including pores made of a light-transmitting material, and a refractive index of the cover layer at a reference wavelength $\lambda_0$ (400 nm ≤ $\lambda_0$ ≤ 700 nm) is preferable to be lower than a refractive index of the light-transmitting material itself.

In the anti-reflection film according to the present invention, the base layer is preferable to be an optical thin film composed of a single layer, and a value of a refractive index $n_b$ of the base layer is between a value of a refractive index of the optical element and a value of a refractive index of a material constituting the concave-convex nanostructure.

In the anti-reflection film according to the present invention, an optical thickness ($n_b \times d_b$) of the base layer is preferable to satisfy a following expression (2).

[Expression 2]

$$0.1 \times (\lambda_0/4) < n_b \times d_b < 1.5 \times (\lambda_0/4) \quad (2)$$

where, $n_b$: refractive index of the base layer
$d_b$: physical thickness of the base layer
$\lambda_0$: reference wavelength In the anti-reflection film according to the present invention, the base layer may be an optical thin film composed of more than one layer, and is an equivalent stack to the single layer optical thin film above at a reference wavelength $\lambda_0$ (400 nm≤$\lambda_0$≤700 nm).

In the anti-reflection film according to the present invention, the base layer is preferable to be an optical thin film composed of at least two layers obtained by alternately stacking a layer having a refractive index of 2.0 or more at a reference wavelength $\lambda_0$ (400 nm≤$\lambda_0$≤700 nm) and a layer having a refractive index of 1.38 to 1.7 at the reference wavelength $\lambda_0$.

In the anti-reflection film according to the present invention, the concave-convex nanostructure is preferable to be made of a resin material, and the pitch width of 200 nm or less.

The anti-reflection film according to the present invention is preferable to be provided on an optical element in which a refractive index of incident light at d-line is 1.4 to 2.1 inclusive.

In the anti-reflection film according to the present invention, the cover layer is preferable to be formed by depositing a light-transmitting material on peaks of the convex part constituting the concave-convex nanostructure by physical vapor deposition method while rotating the optical element which is held by dome-like or planet-like substrate holder.

An anti-reflection optical element according to the present invention is characterized in that the anti-reflection film is provided on an optical surface of an optical element.

A method for manufacturing an anti-reflection film according to the present invention is a method for manufacturing the anti-reflection film, characterized in comprising the steps of: formation of a base layer on an optical surface of an optical element; formation of a concave-convex nanostructure on a surface of the base layer; and formation of a cover layer by depositing a light-transmitting material on peaks of the convex part constituting the concave-convex nanostructure by physical vapor deposition method while rotating the optical element held by dome-like or planet-like substrate holder in which the base layer and the concave-convex nanostructure are formed.

In the present invention, the cover layer that covers peaks of the convex part constituting the concave-convex nanostructure is provided in the anti-reflection film comprising the concave-convex nanostructure. Thus, the high-temperature and high-humidity environment resistance and the scratch resistance of the anti-reflection film can be improved because adsorption of water or the like on the surface of the concave-convex nanostructure is prevented.

Further in the present invention, the cover layer covers the outer side of the concave-convex nanostructure at peaks of the convex part with the void being provided between the cover layer and the concave parts of the concave-convex nanostructure. When the entire surface of the concave-convex nanostructure is covered with the cover layer without a void between the cover layer and the concave-convex nanostructure along a surface shape, i.e. a concave-convex shape of the concave-convex nanostructure, incident light may be reflected by an optical thin film constituting material that covers the surfaces of the convex part constituting the concave-convex nanostructure. That is, the anti-reflection function of the concave-convex nanostructure may be inhibited. However, when just the peaks of the convex part constituting the concave-convex nanostructure are covered with the cover layer and the void is provided between the cover layer and the concave parts as in the present invention, difference in the refractive index between the concave-convex nanostructure and the air as a medium of incident light is made smaller, and the reflection can be reduced.

Moreover, provision of both the cover layer as the second optical thin film and the base layer as the first optical thin film makes a refractive index distribution in a depth direction of the entire anti-reflection film closer to a refractive index distribution more ideal in reducing the reflection of incident light as compared to a case in which the anti-reflection film is composed of just the concave-convex nanostructure. Thus, the anti-reflection performance can be improved as compared to the case in which the anti-reflection film is composed of just the concave-convex nanostructure.

As described above, according to the present invention, the high-temperature and high-humidity environment resistance and the scratch resistance of the anti-reflection film comprising the concave-convex nanostructure can be made excellent, and the anti-reflection performance can be further improved.

DETAILED DESCRIPTION OF THE EMBODIMENTS

An embodiment of an anti-reflection film, an anti-reflection optical element, and a method for manufacturing the anti-reflection film according to the present invention will be described with reference to the drawings.

1. Anti-Reflection Film

Figure 1:
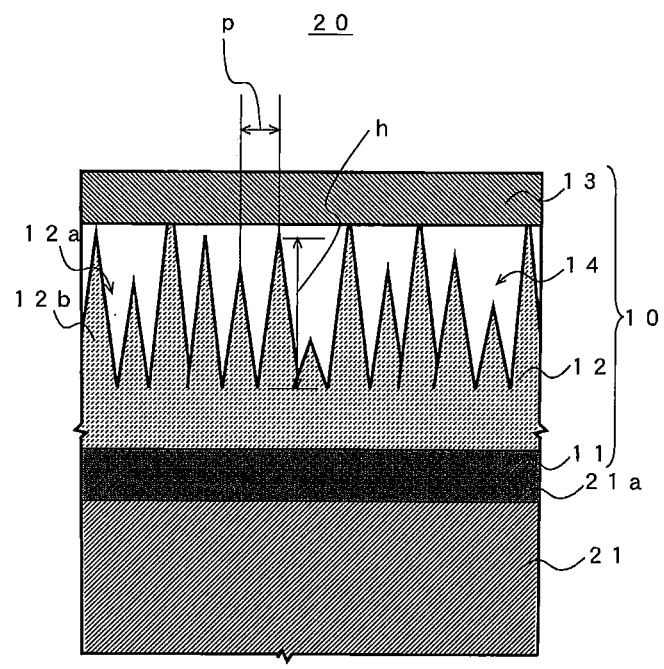
FIG. 1 is a schematic view illustrating the cross-section of an anti-reflection optical element according to the present invention.
Figure 2:
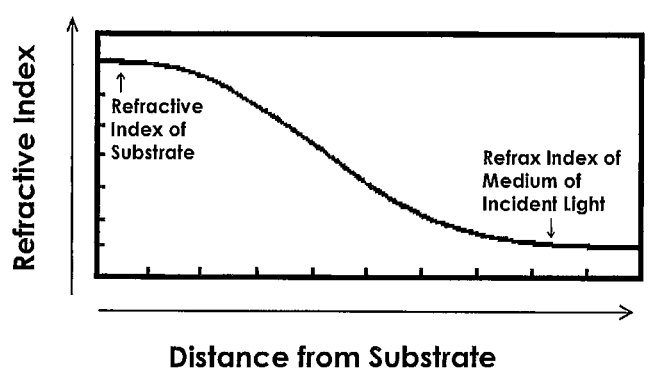
FIG. 2 is a graph showing one example of an ideal refractive index distribution corresponding to an optical thickness of an anti-reflection film composed of a refractive index gradient layer.
Figure 3:
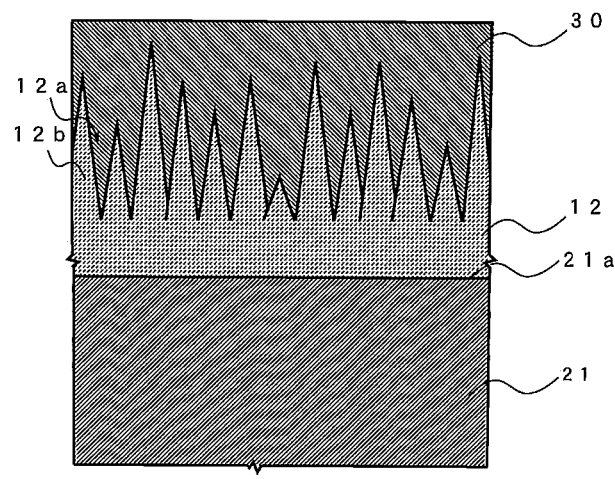
FIG. 3 is a schematic view demonstrating the construction of a cover layer for comparison with the anti-reflection optical element according to the present invention.

First, the construction of an anti-reflection film 10 and an anti-reflection optical element 20 comprising the anti-reflection film 10 on an optical surface 21a of an optical element 21 according to the present embodiment will be described with reference to FIGS. 1 to 3. FIG. 1 is a schematic view illustrating the construction of the anti-reflection film 10 and the anti-reflection optical element 20 according to the present embodiment. As shown in FIG. 1, the anti-reflection film 10 according to the present embodiment comprises a base layer 11 as a first optical thin film that is provided on the optical surface 21a of the optical element 21, a concave-convex nanostructure 12 that is provided on the surface of the base layer 11, and a cover layer 13 that covers the peaks of the convex part 12b on the outer side of the concave-convex nanostructure 12 with a void 14 (an air layer) being provided between the cover layer 13 and concave part 12a. That is, the present invention is characterized in employing a construction in which a refractive index gradient layer (a concave-convex nanostructure layer) composed of the concave-convex nanostructure 12 with the void is put between the base layer 11 as the first optical thin film and the cover layer 13 as a second optical thin film. In the following, the concave-convex nanostructure 12 will be described first, and the cover layer 13 and the base layer 11 will then described one by one although the order differs from the order of stacking the respective layers.

(1) Concave-Convex Nanostructure 12

As shown in FIG. 1, the concave-convex nanostructure 12 comprises the plurality of (numerous) convex parts 12b that protrude from the optical surface 21a side of the optical element 21. The convex part 12b constituting the concave-convex nanostructure 12 is arranged adjacent to each other. Each of the convex part 12b has a tapered shape such as a cone, a pyramid, and a polygonal pyramid (including a shape whose peak is partially cut out respectively). A gradual refractive index distribution is formed from the air as a medium of incident light to a depth direction of the concave-convex nanostructure 12. That is, the concave-convex nanostructure is a so-called refractive index gradient layer (a refractive index inclined layer; a graded layer), and reflection of incident light can be reduced by providing the gradual refractive index distribution in the depth direction.

Pitch width: In the concave-convex nanostructure 12, a pitch width p of the convex part 12b is preferable to be shorter than the wavelength of incident light, and more preferably, 200 nm or less. Here, the pitch width p indicates, for example, a distance between peak positions of the convex part 12b adjacent to each other. The pitch width p can be measured by electron microscope observation.

As the pitch width p of the convex part 12b is specified to be 200 nm or less, the outer side of the concave-convex nanostructure 12 can be covered in the state in which the void 14 is provided between the cover layer 13 and the concave part 12a by forming the cover layer 13 by physical vapor deposition method such as a vacuum vapor deposition method described later. In other words, when the pitch width p of the convex part 12b is 200 nm or less and the cover layer 13 is formed by the vacuum vapor deposition method or the like, the outer side of the concave-convex nanostructure 12 can be covered with the cover layer 13 without filling the concave part 12a with a cover layer constituting material (a light-transmitting material) by employing a characteristic deposition method according to the present invention.

In contrast, when the pitch width p exceeds 200 nm, the concave part 12a constituting the concave-convex nanostructure 12 are likely to be filled with the cover layer constituting material when the cover layer 13 is formed by the vacuum vapor deposition method or the like. When the concave part 12a constituting the concave-convex nanostructure 12 are filled with the cover layer constituting material, the gradual refractive index distribution formed in the depth direction of the concave-convex nanostructure 12 cannot be maintained and anti-reflection performance of the concave-convex nanostructure 12 may be made poor. Further, when the pitch width p exceeds 200 nm, light scattering, loss of transmitted light or stray light may generate, and the function of the cover layer 13 as a protective coat may also be made poor.

Height: A height h of the convex part 12b is preferable to be from 50 nm to 250 nm inclusive. Here, "the height h of the convex part 12b" indicates a distance from a bottom to a peak of the convex part 12b as shown in FIG. 1. The height h of the convex part 12b can be measured by electron microscope observation. As the height h of the convex part 12b is specified to be from 50 nm to 250 nm inclusive, the gradual refractive index distribution can be achieved in the depth direction of the concave-convex nanostructure 12 by forming the convex part 12b in a tapered shape. Thus, the reflection of incident light in a visible light range can be effectively prevented. In contrast, the height h of the convex part 12b of less than 50 nm is not preferable because an anti-reflection effect against to visible light is made poor. The larger the height h of the convex part 12b is preferable because an anti-reflection effect on the incident light in a wider wavelength range and at a wider incident angle can be achieved. The height of the convex part is also preferable to be larger than the width of the convex part. However, with the height h exceeding 250 nm, it is difficult to form the convex part having such a height while maintaining the pitch width p of the convex part at 200 nm or less. So, the height h is preferable to be 250 nm or less from the manufacturing point of view.

However, as long as the concave-convex nanostructure 12 can perform the required anti-reflection effect, the height h of the convex part 12b is not specifically limited in the present invention. The range described above is just a preferable range. Thus, even when the height h is out of the range, no specific problem occurs as long as the concave-convex nanostructure 12 performs the required anti-reflection effect.

Constituting material: A resin material is preferable to be used as a material constituting the concave-convex nanostructure 12. When the resin material is used, the concave-convex nanostructure 12 can be accurately formed with the pitch width described above as compared to an inorganic material. Specific examples of the resin material include a PMMA resin (a polymethylmethacrylate resin), a ZEONEX (registered trademark (the same applies to the description below)) resin manufactured by ZEON CORPORATION, a polycarbonate resin, a cycloolefin resin, a polyether sulfone resin, a polyether imide resin, a polyamide resin, a PET resin, and a CR-39 resin (registered trademark (the same applies to the description below)) (allyl diglycol carbonate) manufactured by PPG Industries, Inc.

(2) Cover Layer 13

Next, the cover layer 13 will be described. As has been already described, in the anti-reflection film 10 according to the present invention, the cover layer 13 covers the outer side of the concave-convex nanostructure 12 such that peaks of the convex part 12b constituting the concave-convex nanostructure 12 are covered with the cover layer 13 with the void 14 being provided between the cover layer 13 and the concave part 12a constituting the concave-convex nanostructure. The cover layer 13 is a layer having functions as both the protective coat of the concave-convex nanostructure 12 and the optical thin film.

First, the function as the optical thin film of the cover layer 13 will be described. In general, to reduce the reflection of incident light by the anti-reflection film composed of the refractive index gradient layer, it is considered ideal to exhibit a refractive index distribution, for example, as shown in FIG. 2 corresponding to the optical thickness of the refractive index gradient layer (see Non Patent document 1). Note that the refractive index distribution shown in FIG. 2 is merely one example. However, when the anti-reflection film is composed of just a concave-convex shape or the like of the concave-convex nanostructure 12, it is difficult to manufacture the anti-reflection film to have the refractive index distribution in the depth direction being ideal in the reflection reduction of incident light.

Thus, in the present invention, the cover layer 13 that functions as the optical thin film is provided at an interface on the medium side of incident light into the concave-convex nanostructure 12, and an optical thickness ($n_c \times d_c$) and a refractive index $n_c$ of the cover layer 13 are appropriately adjusted. The refractive index distribution of the anti-reflection film 10 at the medium-side interface can be made closer to the refractive index distribution ideal in the refection reduction.

Refractive index $n_c$: The refractive index $n_c$ of the cover layer 13 is required to be a value satisfying a following expression (1) in a relationship with a physical thickness $d_c$. In addition, the refractive index $n_c$ is preferable to be 1.15 to 1.8 inclusive at a reference wavelength $\lambda_0$ (400 nm≤$\lambda_0$≤700 nm). As it is difficult to manufacture the cover layer 13 having a refractive index $n_c$ of less than 1.15, the refractive index $n_c$ is preferable to be 1.15 or more from the manufacturing point of view. In contrast, when the refractive index $n_c$ of the cover layer 13 exceeds 1.8, a difference in the refractive index at an interface between the air (the medium through which incident light is propagated before entering the optical element) and the cover layer 13 may increase to make the refractive index distribution in the depth direction viewed as the entire anti-reflection film 10 closer to the refractive index distribution ideal in reducing the reflection difficult although it depends on the material constituting the concave-convex nanostructure 12 or the concave-convex shape thereof. As a result, it is difficult to improve the anti-reflection performance of the anti-reflection film 10. Thus, the refractive index $n_c$ of the cover layer 13 is preferable to be 1.15 to 1.8 inclusive as described above. From the viewpoint of further improving the anti-reflection performance of the anti-reflection film 10, the refractive index $n_c$ of the cover layer 13 is preferable to be lower in the above range, and more preferably, 1.15 or less. Further, even when the refractive index $n_c$ of the cover layer 13 exceeds 1.8, the function as the protective coat can be satisfied without deteriorating the anti-reflection performance as compared to a case in which the anti-reflection film is composed of just the concave-convex nanostructure 12 when the refractive index $n_c$ is 2.35 or less.

Optical thickness ($n_c \times d_c$): The optical thickness ($n_c \times d_c$) of the cover layer 13 is preferable to satisfy the following expression (1).

[Expression 3]

$$0.05 \times (\lambda_0/4) < n_c \times d_c < 0.75 \times (\lambda_0/4) \quad (1)$$

where,
$n_c$: refractive index of the cover layer
$d_c$: physical thickness of the cover layer
$\lambda_0$: reference wavelength That is, when the optical thickness ($n_c \times d_c$) obtained by multiplying the refractive index $n_c$ of the cover layer 13 by the physical thickness $d_c$ of the cover layer 13 is set within the above range, the reflectance can be reduced as compared to the case in which the anti-reflection film is composed of just the concave-convex nanostructure 12, the anti-reflection performance can be improved. In contrast, when the optical thickness ($n_c \times d_c$) of the cover layer 13 is (0.05×($\lambda_0$/4)) or less, the physical thickness is too thin not to cover peaks of the convex part 12b constituting the concave-convex nanostructure 12, and the cover layer 13 may not function as the optical thin film. In addition, the cover layer 13 may not also sufficiently perform the function as the protective coat to prevent mechanical damage on the concave-convex nanostructure 12. Next, when the optical thickness ($n_c \times d_c$) of the cover layer 13 is (0.75×($\lambda_0$/4)) or more, the optical thickness of the cover layer 13 is too thick to reflect or scatter the incident light at the cover layer 13, and result a loss of transmitting light.

Film condition: To achieve the strength as the protective coat and a lower refractive index by using an existing material, the cover layer 13 is preferable to be formed as a porous film including pores formed in deposition made of a light-transmitting material. By forming the cover layer 13 as the porous film, the refractive index of the cover layer 13 can be made lower than the refractive index of the light-transmitting material itself constituting the cover layer 13. That is, the refractive index of the cover layer 13 can be made lower than the refractive index of the light-transmitting material itself, i.e. the refractive index of the light-transmitting material in a bulk state. For example, when the light-transmitting material is deposited by the physical vapor deposition method such as the vacuum vapor deposition method, the porous film made of the light-transmitting material can be obtained by carrying out the deposition while leaving the pores formed during secondary particle growth. The deposition method can disperse the pores of about several nm (e.g., 5 nm or less) in the cover layer 13.

Pore volume percentage: The pore volume percentage is preferable to be less than 70% of the volume of the cover layer 13. When the pore volume percentage is 70% or more, mechanical strength of the cover layer 13 is made poor, and the function as the protective coat may be made poor. From the above viewpoint, the pore volume percentage is more preferable to be less than 50%, and most preferably, less than 30% of the volume of the cover layer 13. By the way, the minimum value of the pore volume percentage can be set to an appropriate value according to the refractive index of the light-transmitting material and the refractive index required for the cover layer 13, i.e. the minimum value is not specifically limited.

Constituting material: An inorganic light-transmitting material is preferable to be used as the light-transmitting material constituting the cover layer 13. The cover layer 13 has the function as the protective coat which prevents mechanical damage on the concave-convex nanostructure 12 and improves the scratch resistance of the anti-reflection film 10 as described above. Since the inorganic light-transmitting material generally has higher mechanical strength than a resin light-transmitting material, the inorganic light-transmitting material is preferable to be used as the constituting material of the cover layer 13.

Moreover, the cover layer 13 functions as the optical thin film to adjust the refractive index distribution in the depth direction of the anti-reflection film 10 to the ideal refractive index distribution, and is provided in order to improve the anti-reflection performance of the anti-reflection film 10 as described above. As the inorganic light-transmitting material has a wider refractive index range and higher the degree of freedom in selecting the material in optical design than the resin light-transmitting material, the inorganic light-transmitting material is preferable to be used as the material constituting the cover layer 13. By depositing the inorganic light-transmitting material while including the pores by the physical vapor deposition method described later, the refractive index of the cover layer 13 can be made lower than the refractive index of the material itself. Thus, the degree of freedom in selecting the material in optical design can be further increased.

Examples of the inorganic light-transmitting material having a refractive index of 1.8 or less include $Al_2O_3$, and a mixture of $Al_2O_3$ and $La_2O_3$. Examples of the inorganic light-transmitting material having a refractive index of 1.5 or less include $SiO_2$ and $MgF_2$. By using the above materials, the cover layer 13 having a refractive index in the above range can be formed. Materials including $Nb_2O_5$, $Ta_2O_5$, $TiO_2$, a mixture of $La_2O_3$ and $TiO_2$, $HfO_2$, $SnO_2$, $ZrO_2$, $La_2O_3$, a mixture of $ZrO_2$ and $TiO_2$, and a mixture of $Pr_6O_{11}$ and $TiO_2$ have a refractive index of 1.8 or more. However, even using these light-transmitting materials, the cover layer 13 having a refractive index of 1.8 or less can be formed by depositing the cover layer 13 to include the pores.

(3) Base Layer 11

Next, the base layer 11 will be described. The base layer 11 is a layer that functions as the (first) optical thin film as described above. The base layer is composed of a single layer or more than one layer. The function of the base layer 11 as the optical thin film is substantially the same as the cover layer 13. That is, the base layer 11 sandwiched between the optical surface 21a of the optical element 21 and the concave-convex nanostructure 12 appropriately adjusted the number of layers, the refractive index, and the optical thickness can make the refractive index distribution of the anti-reflection film 10 at an interface on a base material (the optical element 21) side closer to the refractive index distribution ideal in reducing the reflection of incident light.

(i) Case in which the Base Layer is Composed of a Single Layer

Refractive index $n_b$: A value of the refractive index $n_b$ of the base layer 11 is preferable to be between the value of the refractive index of the optical element 21 and the value of the refractive index of the material constituting the concave-convex nanostructure 12. From the viewpoint of further improving the anti-reflection performance of the anti-reflection film 10, the refractive index $n_b$ of the base layer 11 is preferable to satisfy a following expression (A).

[Expression 4]

$$0.95 \times \sqrt{n_s \times n_p} < n_b < 1.05 \times \sqrt{n_s \times n_p} \quad (A)$$

where,
$n_s$: refractive index of the optical element
$n_p$: refractive index of the material constituting the concave-convex nanostructure
$n_b$: refractive index of the base layer Since the base layer 11 is the optical thin film provided between the optical surface 21a of the optical element 21 and the concave-convex nanostructure 12, when the refractive index $n_b$ of the base layer 11 is set to a value within a range satisfying the above relationship according to a refractive index $n_s$ of the optical element and a refractive index $n_p$ of the material constituting the concave-convex nanostructure 12, the refractive index distribution in the entire anti-reflection film 10 can be made closer to the ideal refractive index distribution. The refractive index $n_b$ of the base layer 11 out of the range is not preferable, because the anti-reflection performance of the anti-reflection film 10 cannot be improved even when the value of an optical thickness ($n_b \times d_b$) described below is appropriate, and is liable to make the anti-reflection performance poor.

Optical thickness ($n_b \times d_b$): The optical thickness ($n_b \times d_b$) of the base layer 11 is preferable to satisfy a following expression (2).

[Expression 5]

$$0.1 \times (\lambda_0/4) < n_b \times d_b < 1.5 \times (\lambda_0/4) \quad (2)$$

where,
$n_b$: refractive index of the base layer
$d_b$: physical thickness of the base layer
$\lambda_0$: reference wavelength The optical thickness ($n_b \times d_b$) of the base layer 11 is more preferable to satisfy a following expression (B) from the viewpoint of further improving the anti-reflection performance of the anti-reflection film 10.

[Expression 6]

$$0.5 \times (\lambda_0/4) < n_b \times d_b < 1.2 \times (\lambda_0/4) \quad (B)$$

where,
$n_b$: refractive index of the base layer
$d_b$: physical thickness of the base layer
$\lambda_0$: reference wavelength When the optical thickness ($n_b \times d_b$) of the base layer 11 is set to a value within a range satisfying the expression (2), the refractive index distribution in the entire anti-reflection film 10 can be made closer to the refractive index distribution ideal in reducing the reflection of incident light, and the anti-reflection performance of the anti-reflection film 10 can be improved. In contrast, the optical thickness ($n_b \times d_b$) of the base layer 11 out of the range is not preferable because the function as the optical thin film of the base layer 11 may be made poor, and the refractive index distribution in the entire anti-reflection film 10 cannot be made closer to the ideal refractive index distribution, and further, the anti-reflection performance may be made poor.

The base layer 11 may have a construction in which more than one layer are physically stacked to be optically equivalent to the single-layer film at a reference wavelength $\lambda_0$.

(ii) Case in which the Base Layer is Composed of More than One Layer

Moreover, when the base layer 11 has the construction in which the plurality of layers are stacked, it is preferable to employ a construction in which a layer having a refractive index of 2.0 or more at a reference wavelength $\lambda_0$ (400 nm≤$\lambda_0$≤700 nm) and a layer having a refractive index between 1.38 and 1.7 at the reference wavelength $\lambda_0$ are alternately stacked. By alternately stacking the high refractive index layer having a refractive index of 2.0 or more and the low refractive index layer having a refractive index between 1.38 and 1.7, the anti-reflection performance can be effectively and greatly improved, and the refractive index distribution in the entire anti-reflection film 10 can be made closer to the ideal refractive index distribution.

Constituting material: The base layer 11 described above can be formed by depositing a single layer or more than one layer made of, for example, $MgF_2$, $SiO_2$, $Al_2O_3$, $Nb_2O_5$, $Ta_2O_5$, $TiO_2$, a mixture of $La_2O_3$ and $TiO_2$, $HfO_2$, $SnO_2$, $ZrO_2$, a mixture of $ZrO_2$ and $TiO_2$, a mixture of $Pr_6O_{11}$ and $TiO_2$; and a mixture of $Al_2O_3$ and $La_2O_3$ by various deposition methods. Examples of the material having a refractive index between 1.38 and 1.7 include $MgF_2$, $SiO_2$, $Al_2O_3$, a mixture of $Al_2O_3$ and $La_2O_3$, and examples of the material having a refractive index between 2.0 and 2.35 include $Nb_2O_5$, $Ta_2O_5$, $TiO_2$, a mixture of $La_2O_3$ and $TiO_2$, $HfO_2$, $SnO_2$, $ZrO_2$, a mixture of $ZrO_2$ and $TiO_2$, and a mixture of $Pr_6O_{11}$ and $TiO_2$.

As described above, in the anti-reflection film 10 according to the present embodiment, since the cover layer 13 covering peaks of the convex part 12b constituting the concave-convex nanostructure 12 is provided, adsorption of water or the like on the surface of the concave-convex nanostructure 12 is prevented, and the high-temperature and high-humidity environment resistance and the scratch resistance of the anti-reflection film 10 can be improved.

In the anti-reflection film 10 according to the present embodiment, the cover layer 13 covers the outer side of the concave-convex nanostructure 12 with the void 14 being provided between the cover layer 13 made of the light-transmitting material and the concave part 12a constituting the concave-convex nanostructure. In contrast, when the entire surface of the concave-convex nanostructure 12 is covered with the cover layer 13 along a surface shape, i.e. cover the concave-convex shape of the concave-convex nanostructure 12 without the void 14 between the cover layer 13 and the concave-convex nanostructure 12 as shown in FIG. 3, for example, incident light is reflected by the light-transmitting material that covers the surfaces of the convex part 12b constituting the concave-convex nanostructure 12, the reflection reducing function of the concave-convex nanostructure 12 may be lost. However, in the present embodiment, peaks of the convex part 12b constituting the concave-convex nanostructure 12 are just covered with the cover layer 13, and the void 14 is provided between the cover layer 13 and the concave part 12a as shown in FIG. 1. Thus, difference in the refractive index between the concave-convex nanostructure 12 and the air as the medium of incident light is made smaller, and the reflection of incident light transmitted through the cover layer 13 can be reduced. As described above, the anti-reflection film 10 according to the above embodiment can achieve excellent high-temperature and high-humidity environment resistance and scratch resistance in addition to improving the anti-reflection performance of the concave-convex nanostructure 12.

Moreover, in the anti-reflection film 10 according to the present embodiment, because the base layer 11 and the cover layer 13 are provided as the optical thin films to sandwich the concave-convex nanostructure 12, the refractive index distribution in the depth direction of the entire anti-reflection film 10 can be made closer to the refractive index distribution more ideal in reducing the reflection of incident light as compared to the case in which the anti-reflection film is composed of just the concave-convex nanostructure 12. Thus, the anti-reflection film 10 according to the present embodiment can improve the anti-reflection performance as compared to the case in which the anti-reflection film is composed of just the concave-convex nanostructure 12.

2. Anti-Reflection Optical Element 20

Next, the anti-reflection optical element 20 according to the present invention will be described. As described above, in the anti-reflection optical element 20 according to the present invention, the anti-reflection film 10 is provided on the optical surface 21a of the optical element 21.

Examples of the optical element 21 include lenses in a digital still camera, an analog still camera, various microscopes, and a telescope. Note that the optical element 21 is not limited to the lenses, and may be various optical elements such as an anti-reflection film, a polarization splitting prism, a color separation prism, an infrared cut filter, a density filter, and an integrator to be also applied. The optical element 21 may be made of a glass material, or a resin material. The material constituting the optical element 21 is not specifically limited.

The refractive index of the optical element 21 is preferable to be 1.4 to 2.1 inclusive as refractive index of incident light at d-line. By providing the above anti-reflection film 10 on the optical surface 21a of the optical element 21, the anti-reflection performance at a level required in the market or more can be achieved. Note that the anti-reflection optical element 20 shown in FIG. 1 is one example of the present invention, which merely schematically shows the layer construction or the like of the anti-reflection film 10. Thus, the anti-reflection optical element 20 is not limited to the shape or the like shown in FIG. 1.

3. Method for Manufacturing the Anti-Reflection Film 10

Next, one example of the method for manufacturing the anti-reflection film 10 will be described with reference to FIGS. 4 and 5. The method for manufacturing the anti-reflection film 10 comprises following steps, for example:

A. The step for formation of a base layer;
B. The step for formation of a concave-convex nanostructure; and
C. The step for formation of a cover layer.

In the following, the steps will be described one by one.

A. The Step for Formation of a Base Layer

In the step for formation of a base layer, the base layer 11 is formed by depositing the materials described above on the optical surface 21a of the optical element 21 by various deposition methods such as a vacuum vapor deposition method, a sputtering method, an ion plating method, an ion-beam vapor deposition method, a CVD method (including a plasma CVD method), and a wet deposition method (dip coating or spin coating).

B. The Step for Formation of a Concave-Convex Nanostructure

The step for formation of a concave-convex nanostructure is a step for providing the concave-convex nanostructure 12 on the surface of the base layer 11. Various methods can be employed depending on the material constituting the base layer 11. In the present invention, the step for formation of a concave-convex nanostructure is not specifically limited. A method using a plasma etching will be described as one example of the method for forming the concave-convex nanostructure 12.

(1) Method Using a Plasma Etching

First, a resin film is provided on the surface of the base layer 11 by using the material such as the PMMA resin described above. A method for forming the resin film is not limited. Then, an inorganic oxide film of $TiO_2$ or the like is preferable to be formed on the optical element 21 provided with the resin film on the surface of the base layer 11 by electron-beam vapor deposition by using a commercially-available vacuum vapor deposition apparatus (e.g., ARES1510 (manufactured by Leybold Optics)). In the process, the electron-beam vapor deposition is preferable to be carried out at a deposition rate of 0.01 nm/sec to 5 nm/sec and a vacuum degree of $1\times10^{-4}$ Pa to $5\times10^{-2}$ Pa. The film thickness of the inorganic oxide film is preferable to be about 0.3 nm to 2 nm when measured with a quartz film thickness meter equipped in the electron-beam vapor deposition apparatus. As the inorganic oxide film, a $SiO_2$ film, an $MgF_2$ film or the like may be deposited by the electron-beam vapor deposition in addition to the $TiO_2$ film.

After that, the plasma etching is carried out for 60 sec to 500 sec at a discharge voltage of 50 V to 150 V, a discharge current of 20 A to 60 A, and a substrate bias range of from 80 V to 150 V by using a plasma source (e.g., APS Pro (manufactured by Leybold Optics)). In the process, Ar is supplied at a flow rate of 5 sccm to 20 sccm and $O_2$ is supplied at a flow rate of 5 sccm to 50 sccm. Here, (sccm] indicates (standard cc/min, 1 atm (atmospheric pressure: 1.013 hPa), 0° C.]. As the resin film is etched by the above processes, the concave-convex nanostructure 12 in which the pitch width p of the convex part 12b is about 50 nm to 200 nm and the height h of the convex part 12b is about 50 nm to 250 nm is formed. The convex part 12b in the concave-convex nanostructure 12 formed by the above method shows a tapered shape.

(2) Other Method

An optical element provided with a surface shape of a concave-convex structure is prepared by the same procedure described above, and then a mold is prepared by nickel electroforming. Then, the concave-convex nanostructure 12 can be formed on the optical element 21 in which the resin film made of the PMMA resin or the like is provided on the base layer 11 by embossing by using the mold.

C. The Step for Formation of a Cover Layer

In the present invention, any method may be employed for the step for formation of a cover layer as long as the cover layer 13 can be formed on the outer side of the concave-convex nanostructure 12 to cover just peaks of the convex part 12b with the void being provided between the cover layer 13 and the concave part 12a. However, as a result of intensive study, the present inventors have thought out that the cover layer 13 having the covering state according to the present invention can be easily and accurately achieved by employing a following method. In the following, the method will be described.

In the present invention, the step for formation of a cover layer is preferable to be performed by depositing the light-transmitting material on peaks of the convex part 12b constituting the concave-convex nanostructure 12 by the physical vapor deposition method while rotating the optical element 21 comprising the concave-convex nanostructure 12 on the optical surface 21a via the base layer 11 which is held by dome-like or planet-like substrate holder. Examples of the physical vapor deposition method include the vacuum vapor deposition method, a magnetron sputtering method, and an ion plating method.

For the cover layer constituting material constituting the cover layer 13, the light-transmitting material having a refractive index of 1.38 to 2.35 inclusive is used as described above. The refractive index of the cover layer 13 made of the above material is preferable to be 1.15 to 1.8 inclusive. The refractive index of the cover layer 13 can be made lower than the refractive index of the cover layer constituting material itself by forming the cover layer 13 as the porous film including the pores. Also, the cover layer constituting material is preferable to be an inorganic light-transmitting material and the specific examples applicable as the light-transmitting materials included have been described above. As for the physical vapor deposition method, an electron-beam vapor deposition method is preferable to be used for example. For example, the commercially-available electron-beam vapor deposition apparatus (e.g., ARES1510 (manufactured by Leybold Optics)) described above may be used to carry out the electron-beam vapor deposition method. In the process, the electron-beam vapor deposition is preferable to be carried out at a deposition rate of 0.1 nm/sec to 10 nm/sec and a vacuum degree of $1\times10^{-4}$ Pa to $5\times10^{-2}$ Pa.

Figure 4:
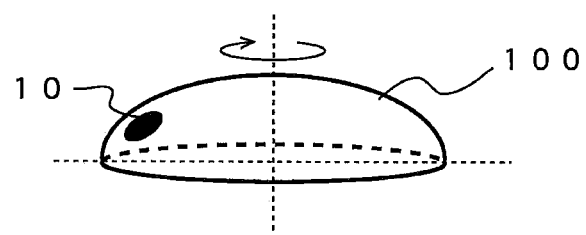
FIG. 4 is a view illustrating the construction of a dome-like spin rotational substrate holder used for formation of a cover layer according to the present invention.

A dome-like spin rotational substrate holder 100 shown in FIG. 4 is preferable to be used for fixing of the optical element 21 provided with the concave-convex nanostructure 12 on the optical surface 21a via the base layer 11. As shown in FIG. 4, the optical element 21 is fixed to the inside of the dome-like spin rotational substrate holder 100 by setting the optical surface 21a provided with the concave-convex nanostructure 12 to be a deposition surface. The vaporized cover layer constituting material is preferable to make contact with the deposition surface at an angle of 20 to 80 degrees while the dome-like spin rotational substrate holder 100 rotates about a rotation shaft (not shown). Alternatively, the optical element 21 is preferable to be fixed to the dome-like spin rotational substrate holder 100 in a region where a distance from the rotation center position is ½ to 1 when a distance from the rotation center position to the outer rim of the dome-like spin rotational substrate holder 100 is 1. In the process, the optical element 21 is more preferable to be fixed to a region where the distance from the rotation center position is ⅔ to 1. As the vaporized cover layer constituting material is made contact with the surface of the spinning concave-convex nanostructure 12 at an inclined angle, the cover layer 13 can be formed on the outer side of the concave-convex nanostructure 12 such that just peaks of the convex part 12b are covered with the cover layer 13 with the void 14 being provided between the cover layer 13 and the concave part 12a without filling the concave part 12a with the cover layer constituting material. Note that an inclined direction against to the surface of the concave-convex nanostructure 12 indicates an inclined direction against to the optical surface 21a of the optical element 21 (the same herein after).

Figure 5:
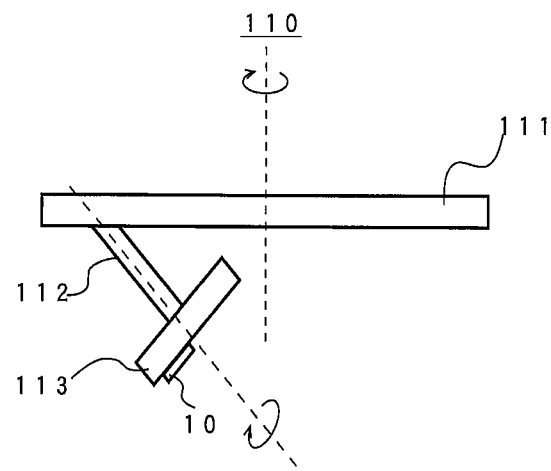
FIG. 5 is a view illustrating the construction of a planet-like spin rotational substrate holder used for forming the cover layer according to the present invention.

In addition, a planet-like spin rotational substrate holder 110 shown in FIG. 5 may also preferable to be used for formation of the cover layer 13. The planet-like spin rotational substrate holder 110 comprises a substantially disc-shaped revolution base (a planet base) 111, a support shaft 112 rotatably provided at an outer peripheral portion of the revolution base 111 to protrude toward the deposition side and be inclined from the outer peripheral side to the rotation center side on a rotation surface of the revolution base 111, and a planet spin base (a planet) 113 whose substrate fixing surface is attached perpendicular to the support shaft 112. The planet spin base 113 also has a substantially disc shape. When the revolution base 111 revolves, the planet spin base 113 also rotates about its axis by the rotation of the support shaft 112. As a result, when the optical element 21 is fixed on the planet spin base 113 by setting the concave-convex nanostructure 12 to be the deposition surface, the optical element 21 is made contact with the vaporized cover layer constituting material while spinning in a planet-like manner. Thus, the cover layer 13 can be formed on the outer side of the concave-convex nanostructure 12 such that just peaks of the convex part 12b are covered with the cover layer 13 with the void 14 being provided between the cover layer 13 and the concave part 12a without filling the concave part 12a constituting the concave-convex nanostructure 12 with the cover layer constituting material. Note that the support shaft 112 is preferable to be provided at an inclined angle of 20 to 70 degrees against to the revolution base 111. When an inclined angle of the support shaft 112 against to the revolution base 111 is arranged at in the above range, the cover layer 13 according to the present invention can be formed.

The embodiment described above is merely one aspect of the present invention, and of course, can be appropriately arranged without departing from the scope of the present invention. Although the present invention will be described below in more detail based on examples and comparative examples, the present invention is not limited to the following examples.

Example 1

In Example 1, a glass lens made of optical glass (product name: S-LAH66 (nd=1.77) manufactured by OHARA INC.) was used as the optical element 21. The concave-convex nanostructure 12 made of the PMMA resin was formed on the optical surface 21a of the optical element 21, and then, the outer side of the concave-convex nanostructure 12 was covered with the cover layer 13 by using $MgF_2$ as the inorganic light-transmitting material to manufacture the anti-reflection film 10 and the anti-reflection optical element 20 of Example 1. In the following, the steps for forming the respective layers will be more specifically described.

The optical element 21 was fixed to the planet-like spin rotational substrate holder by fixing the optical surface 21a to be the deposition surface as shown in FIG. 5. In the process, a position to fix the optical element 21 to the planet-like spin rotational substrate holder was set to make the support shaft incline at 50 degrees against to the revolution base. A PMMA resin film having a film thickness of 0.2 mm was provided on the surface of the optical element 21, and then, a $TiO_2$ film was deposited to a quartz film thickness of 1.25 nm on the surface of the PMMA resin film by the electron-beam vapor deposition by using the vacuum vapor deposition apparatus ARES1510 (Leybold Optics). In the process, the deposition rate was 0.03 nm/s and the vacuum degree in a chamber was $1\times10^{-3}$ Pa. The plasma etching was then performed for about 200 sec (seconds) at a substrate bias of 120 V and a discharge current of 50 A. In the process, an Ar gas and an $O_2$ gas were supplied in the chamber at flow rates of 14 sccm and 30 sccm respectively. By the above processes, the concave-convex nanostructure 12 made of the PMMA resin in which the pitch width p of the convex part 12b was about 100 nm to 200 nm and the height h of the convex part 12b was about 150 nm to 230 nm was formed.

After that, $MgF_2$ was deposited to a quartz film thickness of 39 nm by the vacuum vapor deposition. The anti-reflection film 10 of Example 1 was manufactured as described above. The film construction and the film thickness of the anti-reflection film 10 manufactured in Example 1 were as shown in Table 1. The refractive index ($n_c$) and the optical thickness ($n_c \times d_c$) of the cover layer 13 were 1.15 and 45 nm respectively. The reference wavelength $\lambda_0$ is 550 nm. So, the relationship in the expression (1) is satisfied.

TABLE 1

| | | Constituting material | Refractive index | Physical thickness (nm) |
|---|---|---|---|---|
| Cover layer | Second layer | $MgF_2$ | 1.15 | 39 |
| Refractive index gradient layer | First layer | PMMA resin + air | Substrate side: 1.54 Air side: 1.1 | 206 |
| Substrate | Optical element | PMMA resin S-LAH66 | 1.54 1.77 | 0.2 mm — |

Example 2

In Example 2, a glass lens made of N-BK7 glass (nd=1.52) manufactured by SCHOTT AG Corporation was used as the optical element 21. The concave-convex nanostructure 12 made of the PMMA resin was formed on the optical element 21. After that, $SiO_2$ as the inorganic light-transmitting material was used as the raw material for deposition and the outer side of the concave-convex nanostructure 12 was covered with the cover layer 13 to manufacture the anti-reflection film 10 and the anti-reflection optical element 20 of Example 2. The steps of forming the respective layers will be more specifically described below.

First, a PMMA resin film was formed on the optical surface 21a by a spin coating method. The concave-convex nanostructure 12 was formed on the PMMA resin film in a similar method to Example 1. In the concave-convex nanostructure 12 formed in Example 2, the pitch width of the convex part 12b was about 100 nm to 200 nm, and the height h of the convex part 12b was about 120 nm to 200 nm. The cover layer 13 was formed on the outer side of the concave-convex nanostructure 12 so as to have a film thickness of 10 nm by using $SiO_2$ in a similar manner to Example 1. The film construction and the film thickness of the anti-reflection film 10 manufactured in Example 2 were as shown in Table 2.

The refractive index ($n_c$) and the optical thickness ($n_c \times d_c$) of the cover layer 13 were 1.35 and 14 nm respectively. The reference wavelength $\lambda_0$ is 550 nm. Thus, the relationship in the expression (1) is satisfied.

TABLE 2

|  |  | Constituting material | Refractive index | Physical thickness (nm) |
|---|---|---|---|---|
| Cover layer | Second layer | SiO$_2$ | 1.35 | 10 |
| Refractive index gradient layer | First layer | PMMA resin + air | Substrate side: 1.49 Air side: 1.1 | 189 |
| Substrate | Optical element | N-BK7 | 1.52 | — |

Example 3

The anti-reflection film 10 and the anti-reflection optical element 20 of Example 3 were manufactured in a similar manner to the anti-reflection film 10 and the anti-reflection optical element 20 of Example 2 except that ZrO$_2$+TiO$_2$ was used as the inorganic light-transmitting material constituting the cover layer 13 and the film thickness of the cover layer 13 was 5 nm. The refractive index ($n_c$) and the optical thickness ($n_c \times d_c$) of the cover layer 13 were 1.8 and 9 nm respectively. The reference wavelength $\lambda_0$ is 550 nm. Thus, the relationship in the expression (1) is satisfied.

Example 4

In Example 4, a glass lens made of optical glass (product name: S-LAH55 (nd=1.83) manufactured by OHARA INC.) was used as the optical element 21. An optical thin film composed of a three-layer equivalent stack having a layer construction shown in Table 3 was formed as the base layer 11. Then, the concave-convex nanostructure 12 made of the PMMA resin was formed on the base layer 11. After that, MgF$_2$ as the inorganic light-transmitting material was used as the raw material for deposition and the outer side of the concave-convex nanostructure 12 was covered with the cover layer 13 to manufacture the anti-reflection film 10 and the anti-reflection optical element 20 of Example 4. The steps for forming the respective layers will be more specifically described below.

First, the method for forming the base layer 11 will be described. An Al$_2$O$_3$ film was deposited as a first layer on the optical surface 21a of the glass lens so as to have a physical thickness of 29.4 nm by the vacuum vapor deposition method. Then, a ZrO$_2$+TiO$_2$ film made of a mixture of ZrO$_2$ and TiO$_2$ was deposited as a second layer on the Al$_2$O$_3$ film so as to have a physical thickness of 10 nm similarly by the vacuum vapor deposition method. An Al$_2$O$_3$ film was then deposited as a third layer on the ZrO$_2$+TiO$_2$ film so as to have a physical thickness of 29.4 nm in a similar manner to the first layer.

Then, a PMMA resin film was formed on the optical element by the spin coating method. The concave-convex nanostructure 12 was formed on the PMMA resin film in a similar manner to Example 1. In the concave-convex nanostructure 12 formed in Example 4, the pitch width of the convex part 12b was about 100 nm to 200 nm, and the height h of the convex part 12b was about 120 nm to 200 nm. Then, the cover layer 13 was formed on the outer side of the concave-convex nanostructure 12 so as to have a film thickness of 50 nm by using MgF$_2$ in a similar manner to Example 1. The film construction and the film thickness of the anti-reflection film 10 manufactured in Example 4 are as shown in Table 3. The refractive index ($n_c$) and the optical thickness ($n_c \times d_c$) of the cover layer 13 were 1.15 and 58 nm respectively. The reference wavelength $\lambda_0$ is 550 nm. The refractive index ($n_p$) of the PMMA resin constituting the concave-convex nanostructure 12 was 1.49, and its reference wavelength $\lambda_0$ is similarly 550 nm. Thus, the relationship in the expression (1) is satisfied. The refractive index ($n_b$) and the optical thickness ($n_b \times d_b$) of the equivalent single-layer film of the base layer 11 at the reference wavelength of 550 nm are 1.72 and 119 nm respectively. Thus, the relationship in the expression (2) is satisfied.

TABLE 3

|  |  | Constituting material | Refractive index | Physical thickness (nm) |
|---|---|---|---|---|
| Cover layer | Fifth layer | MgF$_2$ | 1.15 | 50 |
| Refractive index gradient layer | Fourth layer | PMMA resin + air | Substrate side: 1.49 Air side: 1.1 | 185 |
| Base layer | Third layer | Al$_2$O$_3$ | 1.63 | 29.4 |
|  | Second layer | ZrO$_2$ + TiO$_2$ | 2.05 | 10 |
|  | First layer | Al$_2$O$_3$ | 1.63 | 29.4 |
| Substrate | Optical element | S-LAH55 | 1.83 | — |

Example 5

In Example 5, a construction of the base layer 11 provided under the concave-convex nanostructure 12 was made to be four layers stacked, and the film thickness of each layer was set as shown in Table 4. Each layer was formed by the vacuum vapor deposition method in a similar manner to Example 4. The concave-convex nanostructure 12 was formed on the surface of the base layer 11 in a similar manner to Example 1. In the concave-convex nanostructure 12 formed in Example 5, the pitch width of the convex part 12b was about 100 nm to 200 nm, and the height h of the convex part 12b was about 120 nm to 200 nm. The cover layer 13 was formed on the outer side of the concave-convex nanostructure 12 so as to have a film thickness of 61 nm by using MgF$_2$ in a similar manner to Example 1. The refractive index ($n_c$) and the optical thickness ($n_c \times d_c$) of the cover layer 13 were 1.15 and 70 nm respectively. The reference wavelength $\lambda_0$ is 550 nm. The refractive index ($n_p$) of the PMMA resin constituting the concave-convex nanostructure 12 was 1.49, and its reference wavelength $\lambda_0$ is similarly 550) nm. Thus, the relationship in the expression (1) is satisfied.

TABLE 4

|  |  | Constituting material | Refractive index | Physical thickness (nm) |
|---|---|---|---|---|
| Cover layer | Ninth layer | MgF$_2$ | 1.15 | 61 |
| Refractive index gradient layer | Eighth layer | PMMA resin + air | Substrate side: 1.49 Air side: 1.1 | 245 |
| Base layer | Seventh layer | ZrO$_2$ + TiO$_2$ | 2.05 | 10.9 |
|  | Sixth layer | Al$_2$O$_3$ | 1.63 | 60.4 |
|  | Fifth layer | ZrO$_2$ + TiO$_2$ | 2.05 | 34.7 |

TABLE 4-continued

|  |  | Constituting material | Refractive index | Physical thickness (nm) |
|---|---|---|---|---|
|  | Fourth layer | $Al_2O_3$ | 1.63 | 33.7 |
|  | Third layer | $ZrO_2 + TiO_2$ | 2.05 | 44.9 |
|  | Second layer | $Al_2O_3$ | 1.63 | 27.8 |
|  | First layer | $ZrO_2 + TiO_2$ | 2.05 | 22.9 |
| Substrate | Optical element | S-LAH55 | 1.83 | — |

Example 6

In Example 6, an optical lens made of a ZEONEX E48R (registered trademark) resin manufactured by ZEON CORPORATION was used as the optical element 21. The concave-convex nanostructure 12 was formed on the surface of the optical lens. The concave-convex nanostructure 12 was provided on the optical surface 21a of the optical element 21 in a similar manner to Example 1. In the concave-convex nanostructure 12 provided in Example 6, the pitch width of the convex part 12b was about 100 nm to 200 nm, and the height h of the convex part 12b was about 150 nm to 230 nm. The cover layer 13 was formed on the outer side of the concave-convex nanostructure 12 so as to have a film thickness of 38 nm by using $MgF_2$ in a similar manner to Example 1. The film construction and the film thickness of the anti-reflection film 10 manufactured in Example 6 are as shown in Table 5. The anti-reflection film 10 and the anti-reflection optical element 20 of Example 6 was manufactured as described above. The optical thickness ($n_c \times d_c$) and the refractive index ($n_c$) of the cover layer 13 were 44 nm and 1.15 respectively. The reference wavelength $\lambda_0$ is 550 nm. Thus, the relationship in the expression (1) is satisfied.

TABLE 5

|  |  | Constituting material | Refractive index | Physical thickness (nm) |
|---|---|---|---|---|
| Cover layer | Second layer | $MgF_2$ | 1.15 | 38 |
| Refractive index gradient layer | First layer | ZEONEX E48R resin + air | Substrate side: 1.53<br>Air side: 1.1 | 207 |
| Substrate | Optical element | ZEONEX E48R | 1.53 | — |

COMPARATIVE EXAMPLES

Comparative Example 1

The anti-reflection film of Comparative Example 1 was manufactured in a similar manner to the anti-reflection film 10 of Example 1 except that the cover layer 13 was not formed.

Comparative Example 2

The anti-reflection film of Comparative Example 2 was manufactured in a similar manner to the anti-reflection film 10 of Example 2 except that the film thickness of the cover layer 13 was 80 nm. The refractive index ($n_c$) and the optical thickness ($n_c \times d_c$) of the cover layer 13 were 1.35 and 108 nm respectively. Thus, the relationship in the expression (1) is not satisfied.

Comparative Example 3

The anti-reflection film of Comparative Example 3 was manufactured in a similar manner to the anti-reflection film 10 of Example 2 except that the cover layer 13 was not formed.

Comparative Example 4

The anti-reflection film of Comparative Example 4 was manufactured in a similar manner to the anti-reflection film 10 of Example 4 except that the cover layer 13 was not formed.

Comparative Example 5

The anti-reflection film of Comparative Example 5 was manufactured in a similar manner to the anti-reflection film 10 of Example 4 except that the base layer 11 was not provided.

Comparative Example 6

The anti-reflection film of Comparative Example 6 was manufactured in a similar manner to the anti-reflection film 10 of Example 4 except that the film thickness of each layer of the base layer 11 provided between the optical surface 21a of the optical element 21 and the concave-convex nanostructure 12 was set as shown in Table 6. The refractive index ($n_b$) and the optical thickness ($n_b \times d_b$) of the equivalent stack as the base layer 11 at the reference wavelength of 550 nm were 1.7 and 269 nm respectively. Thus, the relationship in the expression (2) is not satisfied.

TABLE 6

|  |  | Constituting material | Refractive index | Physical thickness (nm) |
|---|---|---|---|---|
| Cover layer | Seventh layer | $MgF_2$ | 1.15 | 50 |
| Refractive index gradient layer | Sixth layer | PMMA resin + air | Substrate side: 1.49<br>Air side: 1.1 | 185 |
| Base layer | Fifth layer | $Al_2O_3$ | 1.63 | 35.5 |
|  | Fourth layer | $ZrO_2 + TiO_2$ | 2.05 | 10.3 |
|  | Third layer | $Al_2O_3$ | 1.63 | 71 |
|  | Second layer | $ZrO_2 + TiO_2$ | 2.05 | 10.3 |
|  | First layer | $Al_2O_3$ | 1.63 | 35.5 |
| Substrate | Optical element | S-LAH55 | 1.83 | — |

Comparative Example 7

The anti-reflection film of Comparative Example 7 was manufactured in a similar manner to the anti-reflection film 10 of Example 4 except that the construction of the base layer 11 is as shown in Table 7. The refractive index ($n_b$) and the optical thickness ($n_b \times d_b$) of the base layer 11 are 1.46 and 138 nm respectively.

TABLE 7

|  |  | Constituting material | Refractive index | Physical thickness (nm) |
|---|---|---|---|---|
| Cover layer | Third layer | MgF$_2$ | 1.15 | 50 |
| Refractive index gradient layer | Second layer | PMMA resin + air | Substrate side: 1.49<br>Air side: 1.1 | 185 |
| Base layer | First layer | SiO$_2$ | 1.46 | 94.3 |
| Substrate | Optical element | S-LAH55 | 1.83 | — |

Comparative Example 8

The anti-reflection film of Comparative Example 8 was manufactured in a similar manner to the anti-reflection film 10 of Example 4 except that the construction of the base layer 11 is as shown in Table 8. The refractive index ($n_b$) and the optical thickness ($n_b \times d_b$) of the base layer 11 are 2.05 and 138 nm respectively.

TABLE 8

|  |  | Constituting material | Refractive index | Physical thickness (nm) |
|---|---|---|---|---|
| Cover layer | Third layer | MgF$_2$ | 1.15 | 50 |
| Refractive index gradient layer | Second layer | PMMA resin + air | Substrate side: 1.49<br>Air side: 1.1 | 185 |
| Base layer | First layer | ZrO$_2$ + TiO$_2$ | 2.05 | 67.1 |
| Substrate | Optical element | S-LAH55 | 1.83 | — |

Comparative Example 9

The anti-reflection film of Comparative Example 9 was manufactured in a similar manner to the anti-reflection film 10 of Example 5 except that the cover layer 13 was not formed.

Comparative Example 10

The anti-reflection film of Comparative Example 10 was manufactured in a similar manner to the anti-reflection film 10 of Example 5 except that the base layer 11 was not formed.

Comparative Example 11

The anti-reflection film of Comparative Example 11 was manufactured in a similar manner to the anti-reflection film 10 of Example 6 except that the cover layer 13 was not formed.

Evaluation

1. Evaluation Method

1) Measurement of a refractive index distribution in a film thickness direction (a depth direction) and a reflectance, 2) evaluation of scratch resistance, and 3) evaluation of high-temperature and high-humidity environment resistance were performed on the anti-reflection films (10) manufactured in Examples and Comparative examples respectively. A specific evaluation method will be described below.

1) Measurement of a Refractive Index Distribution in a Film Thickness Direction and a Reflectance The refractive index distribution in the film thickness direction of the anti-reflection film (10) manufactured in Examples and Comparative examples were measured by using a spectroscopic ellipsometer M-2000 manufactured by J. A. Woollam Co., Inc. The reflectance of each of the anti-reflection films (10) for the incident lights having a wavelength in the ranges from 400 nm to 700 nm or from 400 nm to 900 nm into the optical surface 21a of the optical element 21 through the anti-reflection film (10) was also measured. The reflectance was measured by using spectrophotometers FE-3000 and M-2000 manufactured by Otsuka Electronics Co., Ltd.

2) Evaluation of Scratch Resistance

A wiper (MX-CLOTH manufactured by CleanEra) (the same applies to the description below) impregnated with methanol was moved back and forth 10 times at 100 gf on the optical surface 21a side provided with the concave-convex nanostructure 12 of the anti-reflection films (10) manufactured in Examples and Comparative examples. After that, each surface of the anti-reflection films (10) was visually observed by using transmitted and reflected light beams under a fluorescent lamp to check a scratch on the surface.

3) Evaluation of High-Temperature and High-Humidity Environment Resistance

The anti-reflection optical element (20) manufactured in Examples and Comparative examples were kept for 240 hours under a high-temperature and high-humidity environment of 60° C. and 900. Then, the reflectance of each of the anti-reflection films (10) was measured, and a change of the reflectance between before and after keeping under the high-temperature and high-humidity environment was evaluated.

2. Evaluation Results

Here, evaluation results for the above 1) to 3) will be described on comparison among Example 1 and Comparative Example 1; Examples 2 and 3 and Comparative Examples 2 and 3, Example 4 and Comparative Examples 4 to 8, Example 5 and Comparative Examples 9 and 10, and Example 6 and Comparative Example 11.

2-1. Evaluation Results of Example 1 and Comparative Example 1

Figure 6:
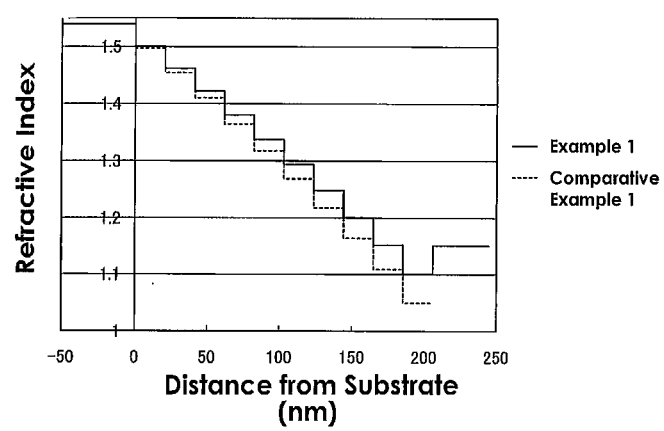
FIG. 6 is a graph showing refractive index distributions in a film thickness direction of anti-reflection film manufactured in Example 1 and Comparative Example 1.
Figure 7:
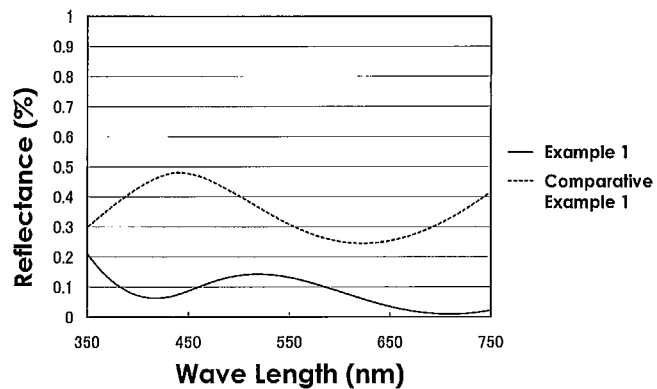
FIG. 7 is a graph showing reflectances corresponding to the wavelength of incident light into the anti-reflection optical element manufactured in Example 1 and Comparative Example 1.

1) Measurement of a Refractive Index Distribution in a Film Thickness Direction and a Reflectance FIG. 6 shows the refractive index distributions in the film thickness direction of the anti-reflection films (10) manufactured in Example 1 and Comparative Example 1. In FIG. 6, the horizontal axis represents a distance from the optical surface 21a of the optical element 21, and the vertical axis represents the refractive index at the reference wavelength $\lambda_0$ (the same applies to FIGS. 8, 10, 12, 14, 16, and 19). FIG. 7 shows the reflectances corresponding to the wavelength of incident light into the respective anti-reflection films (10). In FIG. 7, the horizontal axis represents the wavelength of the incident light to the concave-convex nanostructure 12, and the vertical axis represents the reflectance of the incident light (the same applies to FIGS. 9, 11, 13, 15, 17, 18, and 20).

As shown in FIG. 6, while the refractive index distributions of the respective anti-reflection films (10) are substantially similar to each other, but the refractive index distributions differ from each other on the medium side of the incident light depending on whether the cover layer 13 is provided or not. Since the reflectance of the anti-reflection film 10 of Example 1 is lower than that of the anti-reflection film of Comparative Example 1 over a wide wavelength range as shown in FIG. 7, it is made apparent that the anti-reflection film 10 according to the present invention is excellent in anti-reflection performance. The anti-reflection film 10 of Example 1 shows a very low reflectance of 0.2% or less over the entire incident light wavelength range of 400 nm to 700 nm, and the average reflectance in the incident light wavelength range of 400 nm to 700 nm was 0.09%. In contrast, the average reflectance of the anti-reflection film of Comparative Example 1 in the above incident light wavelength range was 0.34%. As described above, the anti-reflection film 10 of Example 1 provided with the cover layer 13 shows a lower reflectance than the anti-reflection film of Comparative Example 1 provided with just the base layer 11 without the cover layer 13 in a wide wavelength range.

2) Evaluation Result for Scratch Resistance

No scratch was observed on the surface of the anti-reflection film 10 of Example 1 after the optical surface 21a side was rubbed with the wiper. In contrast, a scratch was observed on the surface of the anti-reflection film of Comparative Example 1. Thus, it has been confirmed that the scratch resistance of the anti-reflection film 10 comprising the concave-convex nanostructure 12 can be improved by providing the cover layer 13.

3) Evaluation Result for High-Temperature and High-Humidity Environment Resistance No increase of the reflectance between before and after keeping the anti-reflection film 10 for 240 hours under the high-temperature and high-humidity environment was observed in the anti-reflection film 10 of Example 1. In contrast, a deterioration of the anti-reflection performance, an increase in the reflectance after keeping for 240 hours under the high-temperature and high-humidity environment was observed in the anti-reflection film of Comparative Example 1.

2-2. Evaluation Results of Examples 2 and 3 and Comparative Examples 2 and 3

Figure 8:
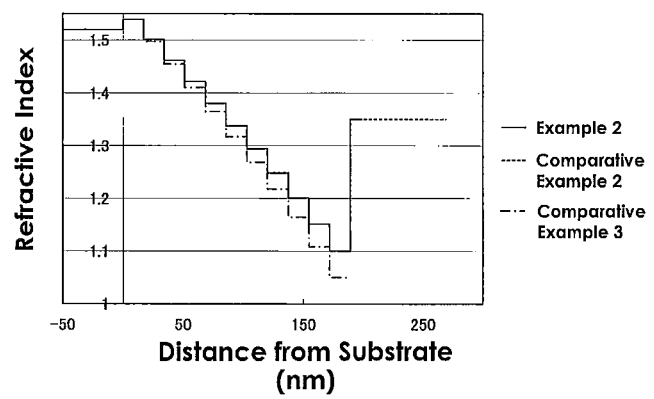
FIG. 8 is a graph showing refractive index distributions in a film thickness direction of anti-reflection film manufactured in Example 2, and Comparative Examples 2 and 3.
Figure 9:
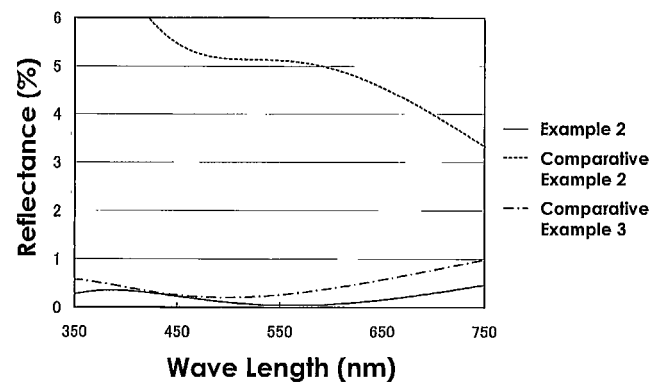
FIG. 9 is a graph showing reflectances corresponding to the wavelength of incident light into the anti-reflection optical element manufactured in Example 2, and Comparative Examples 2 and 3.
Figure 10:
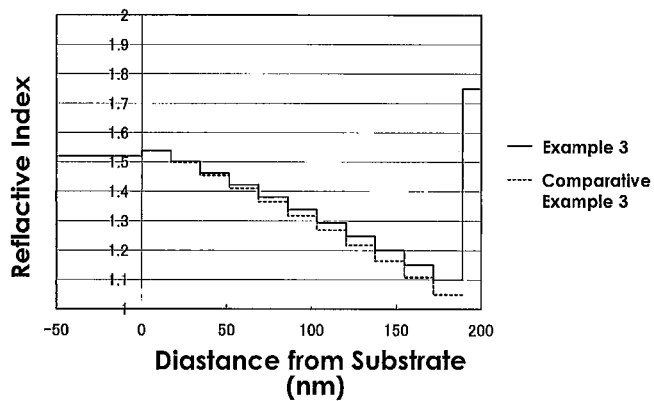
FIG. 10 is a graph showing refractive index distributions in a film thickness direction of anti-reflection film manufactured in Example 3 and Comparative Example 3.
Figure 11:
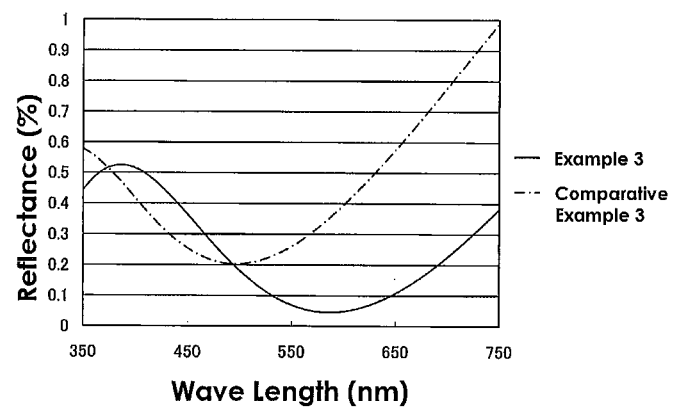
FIG. 11 is a graph showing reflectances corresponding to the wavelength of incident light into the anti-reflection optical element manufactured in Example 3 and Comparative Example 3.

1) Measurement of a Refractive Index Distribution in a Film Thickness Direction and a Reflectance FIG. 8 shows the refractive index distributions in the film thickness direction of the anti-reflection films (10) manufactured in Example 2 and Comparative Examples 2 and 3. FIG. 10 shows the refractive index distributions in the film thickness direction of the anti-reflection films (10) manufactured in Example 3 and Comparative Example 3. FIG. 9 shows the reflectances corresponding to the wavelength of incident light into the respective anti-reflection films (10) manufactured in Example 2 and Comparative Examples 2 and 3. FIG. 11 shows the reflectances corresponding to the wavelength of incident light into the respective anti-reflection films (10) manufactured in Example 3 and Comparative Example 3.

As shown in FIG. 9, the anti-reflection film 10 of Example 2 shows a very low reflectance of 0.4% or less in the entire incident light wavelength range of 400 nm to 700 nm, and the average reflectance in the above wavelength range was 0.15%. In contrast, the average reflectances of the anti-reflection films of Comparative Examples 2 and 3 in the above incident light wavelength range were 5.08% and 0.38% respectively. As described above, the anti-reflection film 10 of Example 2 provided with the cover layer 13 shows a lower reflectance than the anti-reflection film of Comparative Example 3 without the cover layer 13 in a wide wavelength range. The anti-reflection film 10 of Example 2 also shows a lower reflectance in a wide wavelength range than the anti-reflection film of Comparative Example 2 in which the cover layer 13 was thicker than the appropriate range.

As shown in FIG. 11, the anti-reflection film 10 of Example 3 shows a very low reflectance of 0.5% or less in the entire incident light wavelength range of 400 nm to 700 nm, and the average reflectance in the above wavelength range was 0.19%. In contrast, the average reflectance of the anti-reflection film of Comparative Example 3 in the above incident light wavelength range was 0.38%. As described above, the anti-reflection film 10 of Example 3 provided with the cover layer 13 shows a lower reflectance than the anti-reflection film of Comparative Example 3 without the cover layer 13 in a wide wavelength range.

2) Evaluation Result for Scratch Resistance

No scratch was observed on the surfaces of the anti-reflection films (10) of Examples 2 and 3 and Comparative Example 2 after the optical surface 21a side was rubbed with the wiper. In contrast, a scratch was observed on the surface of the anti-reflection film of Comparative Example 3. Thus, it has been confirmed that the scratch resistance of the anti-reflection film 10 comprising the concave-convex nanostructure 12 can be improved by providing the cover layer 13.

3) Evaluation Result for High-Temperature and High-Humidity Environment Resistance No increase of the reflectance between before and after keeping the Anti-reflection optical element 20 for 240 hours under the high-temperature and high-humidity environment was observed in the anti-reflection films (10) of Examples 2 and 3 and Comparative Example 2. In contrast, a deterioration of the anti-reflection performance, an increase in the reflectance after keeping for 240 hours under the high-temperature and high-humidity environment was observed in the anti-reflection film of Comparative Example 3.

2-3. Evaluation Results of Example 4 and Comparative Examples 4 to 8

Figure 12:
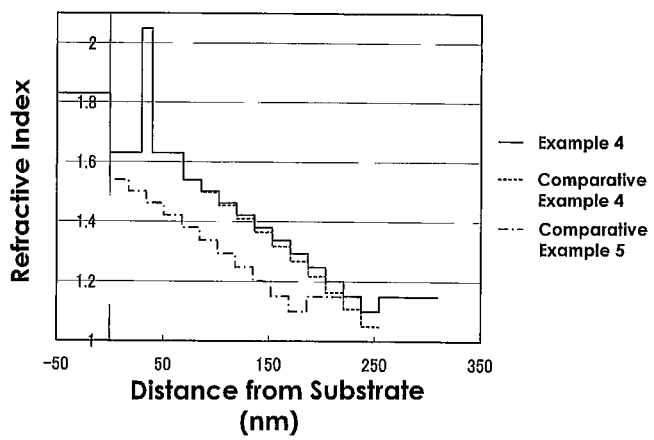
FIG. 12 is a graph showing refractive index distributions in a film thickness direction of anti-reflection film manufactured in Example 4, and Comparative Examples 4 and 5.
Figure 13:
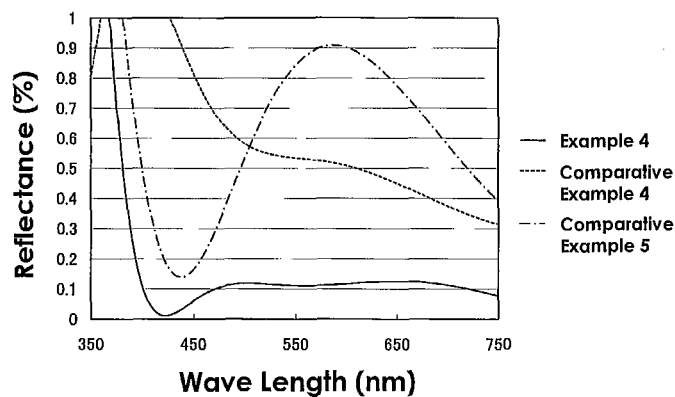
FIG. 13 is a graph showing reflectances corresponding to the wavelength of incident light into the anti-reflection optical element manufactured in Example 4, and Comparative Examples 4 and 5.
Figure 14:
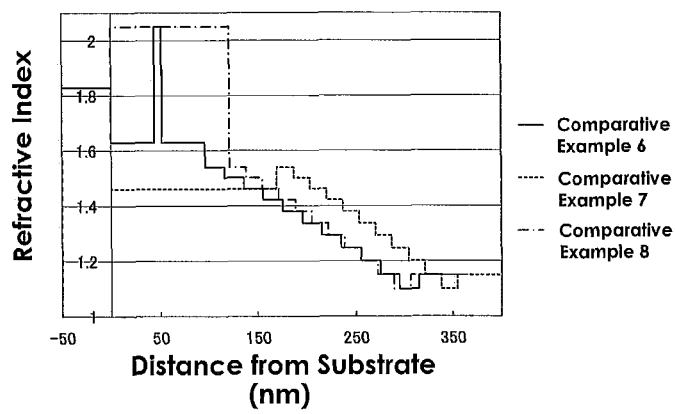
FIG. 14 is a graph showing refractive index distributions in a film thickness direction of anti-reflection film manufactured in Comparative Examples 6, 7, and 8.
Figure 15:
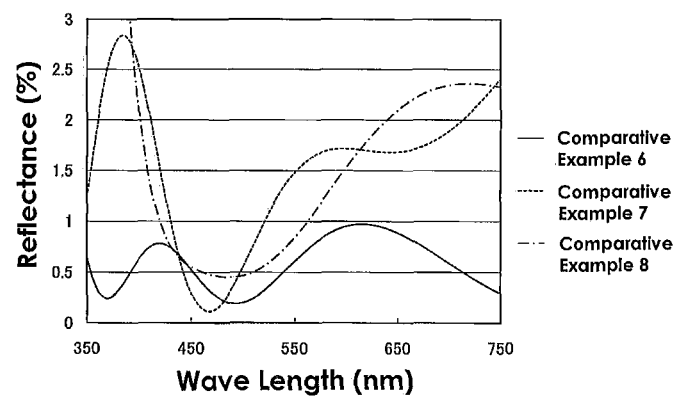
FIG. 15 is a graph showing reflectances corresponding to the wavelength of incident light into the anti-reflection optical element manufactured in Comparative Examples 6, 7, and 8.

1) Measurement of a Refractive Index Distribution in a Film Thickness Direction and a Reflectance FIG. 12 shows the refractive index distributions in the film thickness direction of the anti-reflection films (10) manufactured in Example 4 and Comparative Examples 4 and 5. FIG. 14 shows the refractive index distributions in the film thickness direction of the anti-reflection films (10) manufactured in Comparative Examples 6 to 8. FIG. 13 shows the reflectances corresponding to the wavelength of incident light into the respective anti-reflection films (10) manufactured in Example 4 and Comparative Examples 4 and 5. FIG. 15 shows the reflectances corresponding to the wavelength of incident light into the respective anti-reflection films manufactured in Comparative Examples 6 to 8.

As shown in FIG. 13, the anti-reflection film 10 of Example 4 shows a very low reflectance of 0.2% or less in the entire incident light wavelength range of 400 nm to 700 nm, and the average reflectance in the above wavelength range was 0.1%. In contrast, the average reflectances of the anti-reflection films of Comparative Examples 4 to 8 in the above incident light wavelength range were 0.61%, 0.61%, 0.52%, 2.38%, and 3.28% respectively as shown in FIGS. 13 and 15. As described above, the anti-reflection film 10 of Example 4 provided with the cover layer 13 shows a lower reflectance in a wide wavelength range than the anti-reflection film of Comparative Example 4 without the cover layer 13. The anti-reflection film 10 of Example 4 shows a lower reflectance in a wide wavelength range than the anti-reflection film of Comparative Example 5 without the base layer 11. The anti-reflection film 10 of Example 4 shows a lower reflectance in a wide wavelength range than the anti-reflection film of Comparative Example 6 provided with the cover layer 13 thicker than the appropriate range. The anti-reflection film 10 of Example 4 shows a lower reflectance in a wide wavelength range than the anti-reflection film of Comparative Example 7 provided with the base layer 11 having a lower refractive index than the appropriate range. The anti-reflection film 10 of Example 4 shows a lower reflectance in a wide wavelength range than the anti-reflection film of Comparative Example 8 provided with the base layer 11 having a higher refractive index than the appropriate range.

2) Evaluation Result for Scratch Resistance

No scratch was observed on the surfaces of the anti-reflection films (10) of Example 4 and Comparative Examples 5 to 8 after the optical surface 21*a* side was rubbed with the wiper. In contrast, a scratch was observed on the surface of the anti-reflection film of Comparative Example 4. Thus, it has been confirmed that the scratch resistance of the anti-reflection film 10 comprising the concave-convex nanostructure 12 can be improved by providing the cover layer 13.

3) Evaluation Result for High-Temperature and High-Humidity Environment Resistance No increase of the reflectance between before and after keeping for 240 hours under the high-temperature and high-humidity environment was observed in the anti-reflection films (10) of Example 4 and Comparative Examples 5 to 8. In contrast, a deterioration of the anti-reflection performance, an increase in the reflectance after keeping for 240 hours under the high-temperature and high-humidity environment was observed in the anti-reflection film of Comparative Example 4.

2-4. Evaluation Results of Example 5 and Comparative Examples 9 and 10

Figure 16:
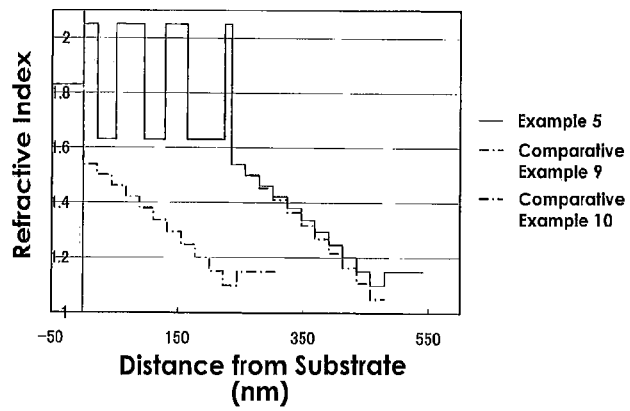
FIG. 16 is a graph showing refractive index distributions in a film thickness direction of anti-reflection film manufactured in Example 5, and Comparative Examples 9 and 10.
Figure 17:
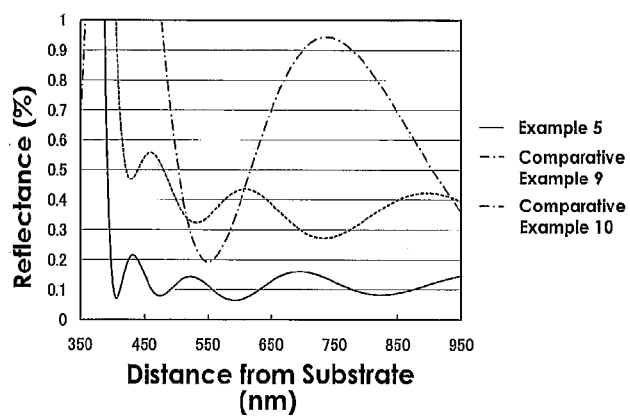
FIG. 17 is a graph showing reflectances corresponding to the wavelength of incident light at an incident angle of 0° into the anti-reflection optical element manufactured in Example 5, and Comparative Examples 9 and 10.
Figure 18:
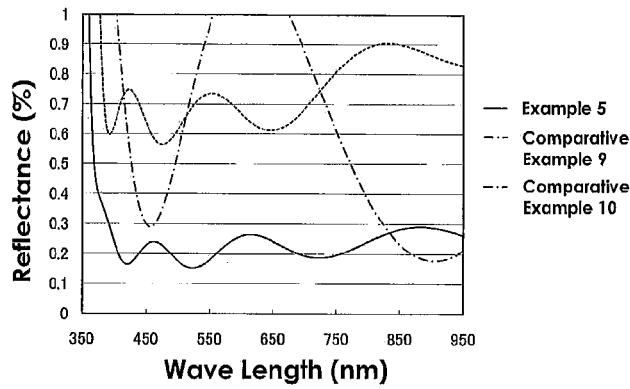
FIG. 18 is a graph showing reflectances corresponding to the wavelength of incident light at an incident angle of 45° into the anti-reflection optical elements manufactured in Example 5, and Comparative Examples 9 and 10.

1) Measurement of a Refractive Index Distribution in a Film Thickness Direction and a Reflectance FIG. 16 shows the refractive index distributions in the film thickness direction of the anti-reflection films (10) manufactured in Example 5 and Comparative Examples 9 and 10. FIGS. 17 and 18 show the reflectances corresponding to the wavelength of incident light into the respective anti-reflection films (10) at incident angles of 0° and 45° respectively.

As shown in FIGS. 17 and 18, the anti-reflection film 10 of Example 5 shows a very low reflectance of 0.3% or less in the entire incident light wavelength range of 400 nm to 900 nm. The average reflectance in the above wavelength range at the incident angle of 0° was 0.15%, and at the incident angle of 45° was 0.24%. In contrast, the average reflectances of the anti-reflection films of Comparative Examples 9 and 10 in the above incident light wavelength range at the incident angle of 0° were 0.4% and 0.63% respectively, and at the incident angle of 45° were 0.68% and 0.78% respectively. As described above, the anti-reflection film 10 of Example 5 provided with the cover layer 13 shows a lower reflectance in a wide wavelength range than the anti-reflection film of Comparative Example 9 without the cover layer 13. The anti-reflection film 10 of Example 5 also shows a lower reflectance in a wide wavelength range than the anti-reflection film of Comparative Example 10 without the base layer 11.

2) Evaluation Result for Scratch Resistance

No scratch was observed on the surfaces of the anti-reflection films (10) of Example 5 and Comparative Example 10 after the optical surface 21*a* side was rubbed with the wiper. In contrast, a scratch was observed on the surface of the anti-reflection film of Comparative Example 9. Thus, it has been confirmed that the scratch resistance of the anti-reflection film 10 comprising the concave-convex nanostructure 12 can be improved by providing the cover layer 13.

3) Evaluation Result for High-Temperature and High-Humidity Environment Resistance No increase of the reflectance between before and after keeping the anti-reflection films 10 for 240 hours under the high-temperature and high-humidity environment was observed in the anti-reflection film (10) of Example 5 and Comparative Example 10. In contrast, a deterioration of the anti-reflection performance, an increase in the reflectance after keeping for 240 hours under the high-temperature and high-humidity environment was observed in the anti-reflection film of Comparative Example 9.

2-5. Evaluation Results of Example 6 and Comparative Example 11

Figure 19:
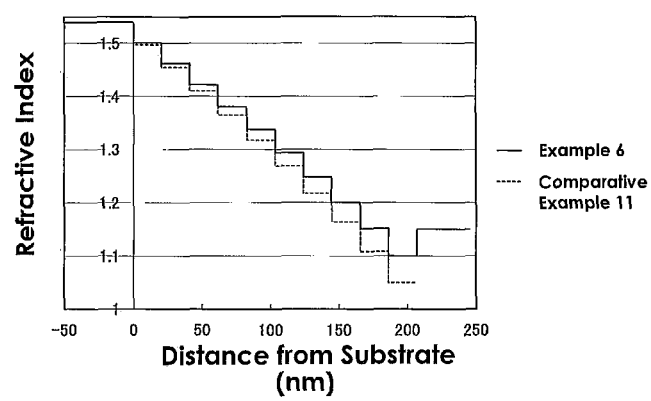
FIG. 19 is a graph showing refractive index distributions in a film thickness direction of anti-reflection film manufactured in Example 6 and Comparative Example 11.
Figure 20:
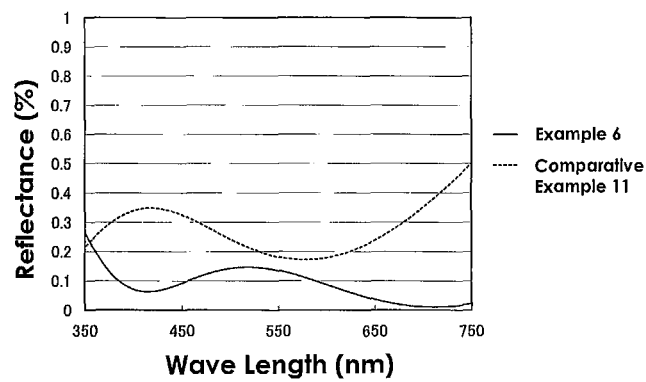
FIG. 20 is a graph showing reflectances corresponding to the wavelength of incident light into the anti-reflection optical elements manufactured in Example 6 and Comparative Example 11.

1) Measurement of a Refractive Index Distribution in a Film Thickness Direction and a Reflectance FIG. 19 shows the refractive index distributions in the film thickness direction of the anti-reflection films (10) manufactured in Example 6 and Comparative Example 11. FIG. 20 shows the reflectances corresponding to the wavelength of incident light into the respective anti-reflection films (10).

As shown in FIG. 20, the anti-reflection film 10 of Example 6 shows a very low reflectance of 0.2% or less in the entire incident light wavelength range of 400 nm to 700 nm, and the average reflectance in the above wavelength range was 0.09%. In contrast, the average reflectance of the anti-reflection film of Comparative Example 11 in the above incident light wavelength range was 0.25%. As described above, the anti-reflection film 10 of Example 6 provided with the cover layer 13 shows a lower reflectance in a wide wavelength range than the anti-reflection film of Comparative Example 11 without the cover layer 13.

2) Evaluation Result for Scratch Resistance

No scratch was observed on the surface of the anti-reflection film 10 of Example 6 after the optical surface 21*a* side was rubbed with the wiper. In contrast, a scratch was observed on the surface of the anti-reflection film of Comparative Example 11. Thus, it has been confirmed that the scratch resistance of the anti-reflection film 10 comprising the concave-convex nanostructure 12 can be improved by providing the cover layer 13.

3) Evaluation Result for High-Temperature and High-Humidity Environment Resistance No increase of the reflectance between before and after keeping for 240 hours under the high-temperature and high-humidity environment was observed in the anti-reflection film 10 of Example 6. In contrast, a deterioration of the anti-reflection performance, an increase in the reflectance after keeping for 240 hours under the high-temperature and high-humidity environment was observed in the anti-reflection film of Comparative Example 11.

The anti-reflection film according to the present invention is excellent in the high-temperature and high-humidity environment resistance, the scratch resistance and the anti-reflection performance. So, the anti-reflection film can be preferably used even under a high-temperature and high-humidity environment, and maintenance can be made easy. So, the anti-reflection film according to the present invention can be preferably applied to various optical elements.

10 . . . Anti-reflection film
11 . . . Base layer
12 . . . Concave-convex nanostructure 13 . . . Cover layer
14 . . . Void
20 . . . Anti-reflection optical element
21 . . . Optical element
21a . . . Optical surface

What is claimed is:

1. An anti-reflection film to be provided on an optical surface of an optical element to reduce reflection of incident light, comprising:
  a base layer as a first optical thin film that is to be provided on the optical surface;
  a concave-convex nanostructure layer that is provided on a surface of the base layer and is composed of a concave-convex nanostructure formed so as to have pitch width between the convex parts of shorter than an incident light wavelength;
  wherein the concave-convex nanostructure comprises a plurality of convex portions;
  wherein the convex portions of the concave-convex nanostructure are tapered, wherein a peak of each convex portion is narrower than a base end of each convex portion; and
  wherein the base ends are provided closer to the base layer than the peaks; and
  the anti-reflection film further comprising a cover layer as a second optical thin film that covers the peaks of the convex part constituting the concave-convex nanostructure with a void being provided between the cover layer and concave part of the concave-convex nanostructure;
  wherein the cover layer contacts the concave-convex nanostructure at a plurality of the peaks;
  wherein the cover layer is a film including pores, wherein the pores are dispersed in the cover layer;
  wherein the cover layer is composed of an inorganic light-transmitting material; and
  wherein an optical thickness $(n_c \times d_c)$ of the cover layer satisfies a following expression (1):

[Expression 1]

$$0.05 \times (\lambda_0/4) < n_c \times d_c < 0.75 \times (\lambda_0/4) \quad (1)$$

where,
$n_c$: refractive index of the cover layer
$d_c$: physical thickness of the cover layer
$\lambda_0$: reference wavelength in the range 400 nm≤$\lambda_0$≤700 nm.

2. The anti-reflection film according to claim 1, wherein the refractive index $n_c$ of the cover layer at a reference wavelength $\lambda_0$ in the range 400 nm≤$\lambda_0$≤700 nm is 1.15 to 1.8 inclusive.

3. The anti-reflection film according to claim 1, wherein the refractive index of the cover layer at the reference wavelength $\lambda_0$ in the range 400 nm≤$\lambda_0$≤700 nm is lower than a refractive index of the light-transmitting material itself.

4. The anti-reflection film according to claim 1, wherein the base layer is an optical thin film composed of a single layer, and a value of a refractive index $n_b$ of the base layer is between a value of a refractive index of the optical element and a value of a refractive index of a material constituting the concave-convex nanostructure.

5. The anti-reflection film according to claim 4, wherein an optical thickness $(n_b \times d_b)$ of the base layer satisfies a following expression (2):

[Expression 2]

$$0.1 \times (\lambda_0/4) < n_b \times d_b < 1.5 \times (\lambda_0/4) \quad (2)$$

where,
$n_b$: refractive index of the base layer
$d_b$: physical thickness of the base layer
$\lambda_0$: reference wavelength in the range 400 nm 700 nm.

6. The anti-reflection film according to claim 1, wherein the base layer is an optical thin film composed of at least two layers obtained by alternately stacking a layer having a refractive index of 2.0 or more at the reference wavelength $\lambda_0$ in the range 400 nm≤$\lambda_0$≤700 nm and a layer having a refractive index of 1.38 to 1.7 at the reference wavelength $\lambda_0$.

7. The anti-reflection film according to claim 1, wherein the concave-convex nanostructure is made of a resin material, and the pitch width is 200 nm or less.

8. The anti-reflection film according to claim 1, wherein the anti-reflection film is provided on the optical element which has a refractive index at d-line of 1.4 to 2.1 inclusive.

9. The anti-reflection film according to claim 1, wherein the cover layer is formed by depositing a light-transmitting material on peaks of the convex part constituting the concave-convex nanostructure by physical vapor deposition method while rotating the optical element which is held by dome-like or planet-like substrate holder.

10. A method for manufacturing an anti-reflection film according to claim 1, comprising the steps of:
  formation of the base layer on an optical surface of an optical element;
  formation of the concave-convex nanostructure on a surface of the base layer; and
  formation of the cover layer by depositing a light-transmitting material on peaks of the convex part constituting the concave-convex nanostructure by physical vapor deposition method while rotating the optical element held by dome-like or planet-like substrate holder in which the base layer and the concave-convex nanostructure are formed.

11. The anti-reflection film according to claim 1, wherein a refractive index of the concave-convex nanostructure layer increases along a depth direction of the concave-convex nanostructure from the peaks of the convex parts toward the concave parts.

12. The anti-reflection film according to claim 1, wherein the base layer is an optical thin film composed of more than one layer, wherein an optical thickness $(n_b \times d_b)$ of the base layer satisfies a following expression (2):

[Expression 2]

$$0.1 \times (\lambda_0/4) < n_b \times d_b < 1.5 \times (\lambda_0/4) \quad (2)$$

where,
$n_b$: effective refractive index of the base layer
$d_b$: physical thickness of the base layer
$\lambda_0$: reference wavelength in the range 400 nm≤$\lambda_0$≤700 nm.

13. The optical element as in claim 1, wherein:
  the anti-reflection film is situated on the optical surface;
  wherein the base layer of the anti-reflection film is an optical thin film composed of more than one layer; and
  wherein the base layer has a value of an effective refractive index $n_b$ between a value of a refractive Index of the optical element and a value of a refractive index of a material constituting the concave-convex nanostructure of the anti-reflection film at the reference wavelength $\lambda_0$ in a range 400 nm≤$\lambda_0$≤700 nm.

14. The anti-reflection film of claim 1, wherein the cover layer is a physical vapor deposition film.

* * * * *

UNITED STATES PATENT AND TRADEMARK OFFICE
CERTIFICATE OF CORRECTION

| | | |
|---|---|---|
| PATENT NO. | : 9,709,704 B2 | Page 1 of 1 |
| APPLICATION NO. | : 13/647510 | |
| DATED | : July 18, 2017 | |
| INVENTOR(S) | : Masaaki Miyahara et al. | |

It is certified that error appears in the above-identified patent and that said Letters Patent is hereby corrected as shown below:

In the Claims

Column 28, Line 4, Claim 5, delete "400 nm 700 nm." and insert -- $400 \text{ nm} \leq \lambda_0 \leq 700 \text{ nm}$. --

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*